United States Patent
Hamada et al.

(10) Patent No.: US 9,789,555 B2
(45) Date of Patent: Oct. 17, 2017

(54) ELECTRICAL DISCHARGE MACHINING METHOD AND ELECTRODE-GUIDE POSITION SETTING DEVICE

(75) Inventors: Kyoichi Hamada, Aiko-gun (JP); Takayuki Shiomizu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 222 days.

(21) Appl. No.: 14/426,708

(22) PCT Filed: Sep. 7, 2012

(86) PCT No.: PCT/JP2012/072962
§ 371 (c)(1),
(2), (4) Date: Mar. 6, 2015

(87) PCT Pub. No.: WO2014/038074
PCT Pub. Date: Mar. 13, 2014

(65) Prior Publication Data
US 2015/0239056 A1 Aug. 27, 2015

(51) Int. Cl.
*B23H 7/18* (2006.01)
*B23H 7/20* (2006.01)
(Continued)

(52) U.S. Cl.
CPC ............ *B23H 7/18* (2013.01); *B23H 7/20* (2013.01); *B23H 7/34* (2013.01); *B23H 9/10* (2013.01);
(Continued)

(58) Field of Classification Search
CPC ... B23H 7/18; B23H 7/34; B23H 9/14; B23H 9/10; B23H 7/20; B23H 1/00;
(Continued)

(56) References Cited

U.S. PATENT DOCUMENTS

| | | | | |
|---|---|---|---|---|
| 4,703,143 A | * | 10/1987 | Okubo | B23H 7/065 219/69.1 |
| 7,329,825 B2 | * | 2/2008 | Awakura | B23H 7/265 219/69.15 |
| 2010/0036519 A1 | * | 2/2010 | Yamada | G05B 19/40937 700/173 |

FOREIGN PATENT DOCUMENTS

| | | |
|---|---|---|
| JP | 2-71933 | 3/1990 |
| JP | 5-84610 | 4/1993 |

(Continued)

OTHER PUBLICATIONS

International Search Report dated Dec. 11, 2012, directed towards International Application No. PCT/JP2012/072962, 2 pages.

*Primary Examiner* — Sean Shechtman
*Assistant Examiner* — Shon Foley
(74) *Attorney, Agent, or Firm* — Morrison & Foerster LLP (57) ABSTRACT

In the present invention, when performing electrical discharge machining on a workpiece via an electrical discharge machine that has an electrode holder and an electrode guide, a workpiece model and an electrode-guide model are generated in advance, an interference-start position at which the electrode-guide model starts interfering with the workpiece model when the electrode-guide model is moved towards the workpiece model along an axis line (CLa) is calculated, and a position obtained by moving the electrode-guide model a prescribed distance away from the workpiece model, starting at the interference-start position, is set as an electrode-guide position. With the electrode guide positioned at the electrode-guide position, the electrode holder is moved downwards in order to move an electrode downwards toward the workpiece surface, and electrical discharge machining is performed on the workpiece.

3 Claims, 9 Drawing Sheets

(51) Int. Cl.
  *B23H 9/10*  (2006.01)
  *B23H 9/14*  (2006.01)
  *B23H 7/34*  (2006.01)
  *G05B 15/02*  (2006.01)
  *G05B 19/402*  (2006.01)
  *B23H 1/00*  (2006.01)

(52) U.S. Cl.
  CPC ............... *B23H 9/14* (2013.01); *G05B 15/02* (2013.01); *G05B 19/402* (2013.01); *B23H 1/00* (2013.01); *G05B 2219/25294* (2013.01); *G05B 2219/35134* (2013.01); *G05B 2219/45043* (2013.01); *G05B 2219/45221* (2013.01); *Y02P 90/265* (2015.11)

(58) Field of Classification Search
  CPC .................. G05B 19/402; G05B 15/02; G05B 2219/35134; G05B 2219/45221; G05B 2219/25294; G05B 2219/45043; G05B 2219/43041
  USPC .......................... 700/23, 26, 86, 87, 159–195
  See application file for complete search history.

(56) References Cited

FOREIGN PATENT DOCUMENTS

| | | |
|---|---|---|
| JP | 2002-224917 | 8/2002 |
| JP | 4087259 | 5/2008 |

\* cited by examiner

ELECTRICAL DISCHARGE MACHINING METHOD AND ELECTRODE-GUIDE POSITION SETTING DEVICE

CROSS-REFERENCE TO RELATED APPLICATIONS

This application is a U.S. National Phase patent application of International Application No. PCT/JP2012/072962, filed on Sep. 7, 2012, which is hereby incorporated by reference in the present disclosure in its entirety.

FIELD OF THE INVENTION

The present invention relates to an electrical discharge machining method for electrical discharge machining using an electrode guide and an electrode-guide position setting device for setting the position of the electrode guide.

BACKGROUND OF THE INVENTION

Conventionally, electrical discharge machines including an electrode guide for supporting an electrode near a workpiece have been known (see Patent Literature 1, for example). In the electrical discharge machine described in Patent Literature 1, the front end of an electrode projected downward by a predetermined length (50 mm) from the bottom endface of an electrode guide is made to abut against the workpiece surface. Thereafter, with the electrode guide fixed, the electrode is moved up by a length (49.5 mm) slightly shorter than the aforementioned predetermined length. Then, the electrode guide and the electrode are moved down by a length (49 mm) slightly shorter than the above length. As a result, the electrode guide is positioned a predetermined distance (1 mm) apart from the workpiece surface with the front end of the electrode projected a predetermined length (0.5 mm) from the bottom endface of the electrode guide.

However, in the positioning method according to above Patent Document 1, the electrode guide is positioned at a point a predetermined distance away from the workpiece surface without taking into account the position of the workpiece, so that when hole machining is implemented on the surface of a workpiece that is tilted, the electrode guide may interfere with the workpiece surface.

PATENT LITERATURE

Patent Literature 1: Japanese Patent No. 4087259

SUMMARY OF THE INVENTION

According to the present invention, an electrical discharge machining method for performing electrical discharge machining on a workpiece by means of an electrical discharge machine including a vertically extended, bar-like electrode, an electrode holder supporting the upper end of the electrode and an electrode guide that is arranged under the electrode holder so as to be vertically movable relative to the electrode holder and that supports the peripheral side of the electrode at the lower end so that the electrode can move up and down, includes the steps of: generating a 3D model of an electrical discharge machine including a workpiece model arranged in a machining attitude and an electrode guide model disposed along an axis on the model that passes through the machining point on the workpiece model; computing the interference start position at which the electrode guide model begins interfering with the workpiece model when the electrode guide model is brought close to the workpiece model along the axis; setting the position obtained by moving the electrode guide model a predetermined distance in the direction away from the interference start position on the workpiece model along the axis, as an electrode guide position; and lowering the electrode toward the workpiece surface by moving the electrode holder down while the electrode guide is positioned at the electrode guide position in order to perform electrical discharge machining on the workpiece.

According to the present invention, an electrode guide position setting device that sets the position of an electrode guide that is arranged under an electrode holder supporting the upper end of a vertically extended, bar-like electrode so as to be vertically movable relative to the electrode holder and that supports the peripheral side of the electrode at the lower end so that the electrode can move up and down, includes: a model acquisition unit for acquiring a 3D model of an electrical discharge machine including a workpiece model arranged in a machining attitude and an electrode guide model disposed along an axis on the model that passes through the machining point on the workpiece model; an operation unit that, based on the 3D model acquired by the model acquisition unit, computes the interference start position at which the electrode guide model begins interfering with workpiece model when the electrode guide model is brought close to the workpiece model along the axis; and a setting unit for setting the position obtained by moving the electrode guide model along the axis a predetermined distance in the direction away from the interference start position calculated by the operation unit, as an electrode guide position.

DETAILED DESCRIPTION OF THE INVENTION

Figure 1:
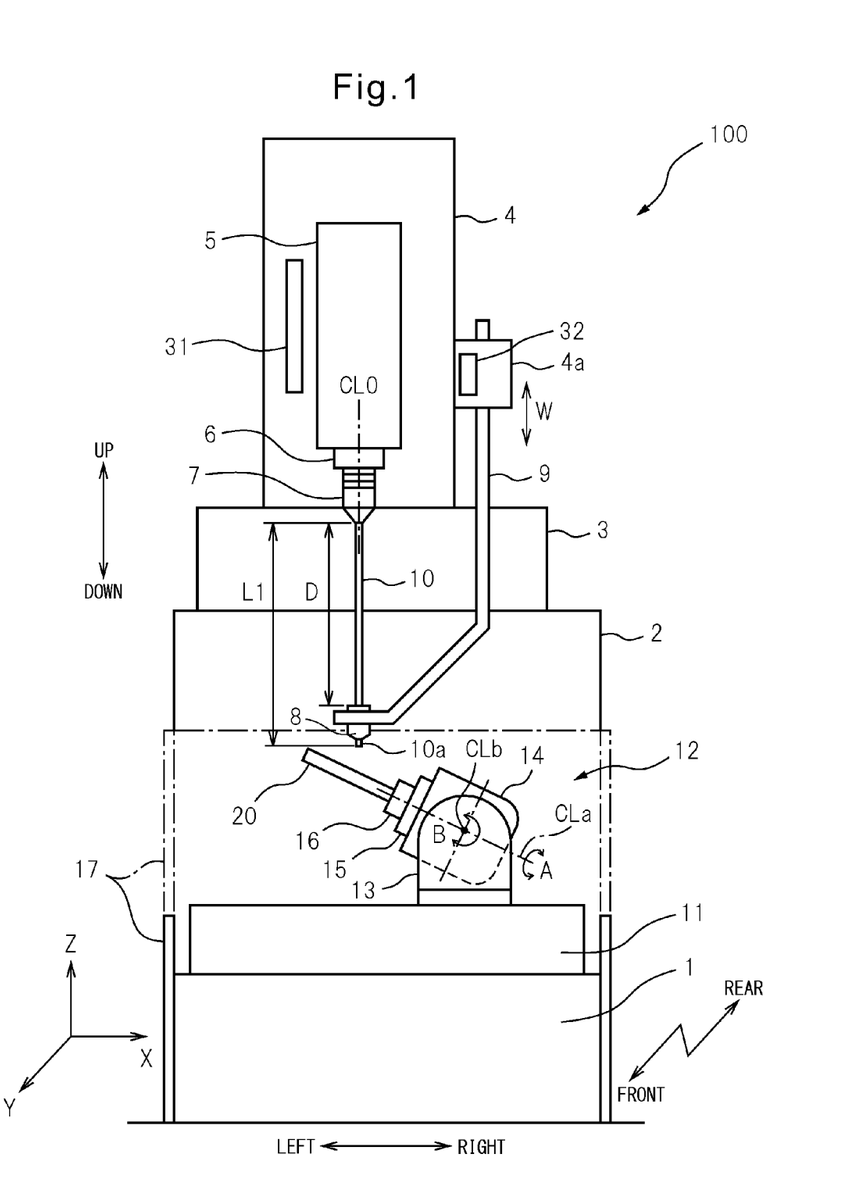
FIG. 1 A front view schematically illustrating essential components of an electrical discharge machine to which the electrical discharge machining method according to an embodiment of the present invention is applied.

Referring to FIGS. 1 to 10, one embodiment of an electrical discharge machining method according to the present invention will be described. FIG. 1 is a front view schematically illustrating essential components of an electrical discharge machine 100 to which the electrical discharge machining method according to the embodiment of the present invention is applied. In the description hereinbelow, the three orthogonal directions (X-axis direction, Y-axis direction, Z-axis direction) are defined as the left-to-right direction, front-to-rear direction and vertical direction, and based on this definition the configuration of each component will be described.

In FIG. 1, a column 2 is fixed upright in the rear part of a bed 1 as a pedestal. An X-slider 3 is supported on the top face of the column 2 so as to be movable in the X-direction (left-to-right direction). A ram 4 is supported on the top face of the X-slider 3 so as to be movable in the Y-direction (front-to-rear direction). A main spindle head 5 is supported on the front face of the ram 4 so as to be movable in the Z-direction (vertical direction). Projected from the bottom face of the main spindle head 5 is the front end of a rotational main spindle 6. An electrode holder 7 is attached to the lower end of the rotational main spindle 6. An electrode guide 8 is disposed vertically below the electrode holder 7, and is supported by the lower end of a grip arm 9. The grip arm 9 is supported by a bracket 4a provided on the right side face of ram 4 so as to be movable in the vertical direction. This vertical moving axis of the grip arm 9 is defined to be the W-axis.

Between the electrode holder 7 and electrode guide 8, an electrode 10 is extended along a vertical axis CL0 that passes through the centers of electrode holder 7 and electrode guide 8. The electrode 10 is a cylindrical pipe electrode and is held at its upper end by the electrode holder 7. The lower end of electrode 10 vertically penetrates through the electrode guide 8. The peripheral side of electrode 10 is supported by the electrode guide 8 so as to be able to slidably move in the vertical direction, whereas its movement (deviation) in the front-to-rear and right-to-left directions is constrained. A machining fluid such as water, etc., is supplied into the pipe electrode 10, so that the machining fluid is ejected from the front end (lower end) of the pipe electrode 10. Oil may be used as the machining fluid.

A table 11 is arranged in front of column 2 on the top face of bed 1. Mounted on the top face of table 11 is a tiltable rotary table device 12. The tiltable rotary table device 12 includes a pair of supporters 13 projected upward from the top face of table 11 and arranged in front and rear positions, a tiltable member 14 supported between the front and rear supporters 13 so as to be rotatable in B-axis directions about a pivot CLb extended in the direction of the Y-axis, and a rotary table 15 supported on the left endface of tiltable member 14 so as to be rotatable in A-axis directions about a pivot CLa perpendicular to the pivot CLb. The rotary table 15 is equipped with a chuck 16, which supports a workpiece 20. An elevatable processing tank 17 is provided around the table 11, so as to enclose the table 11 and tiltable rotary table device 12. The chain line in FIG. 1 depicts a machining state where the processing tank 17 has been raised, whereas in the non-machining state such as in tooling mode, the processing tank 17 is moved down as depicted by a solid line.

Figure 6:
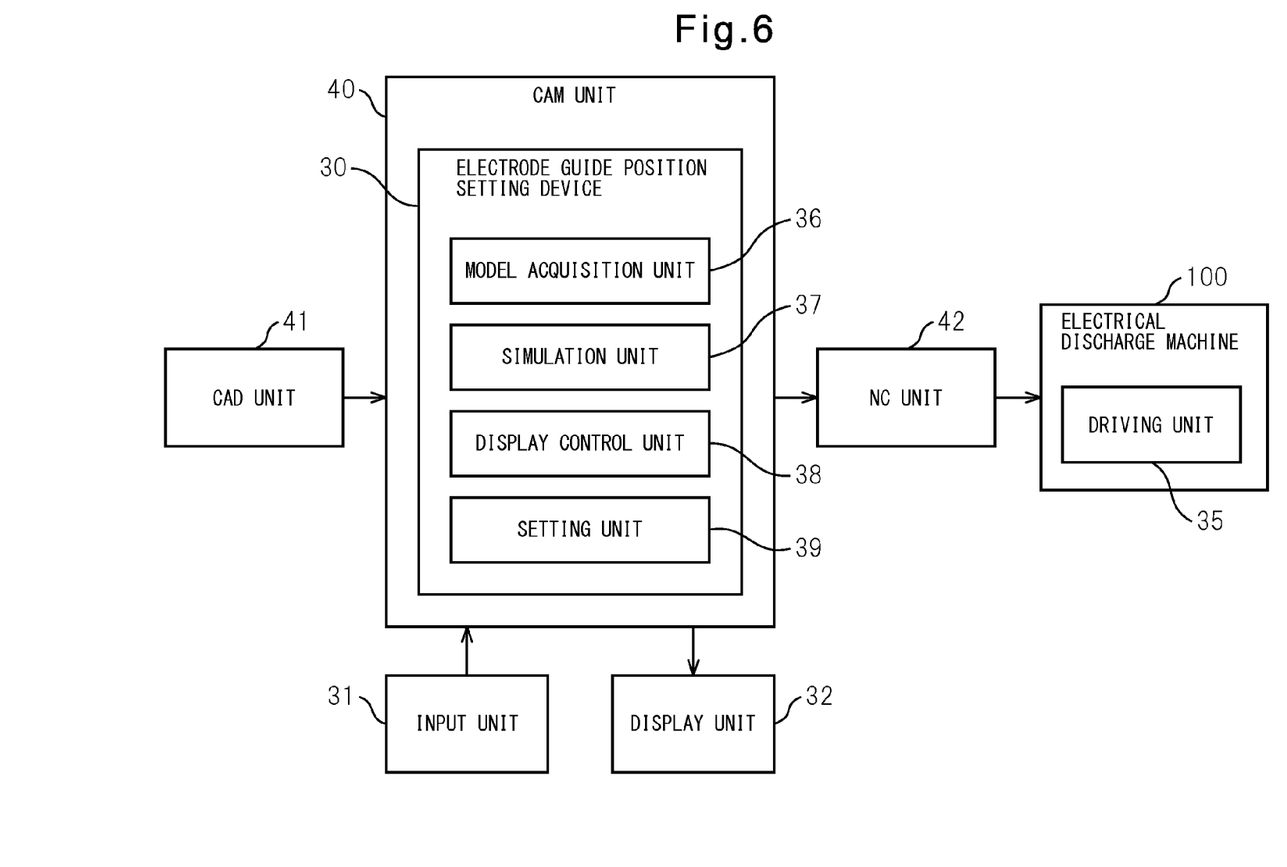
FIG. 6 A block diagram illustrating essential components of an electrode guide position setting device according to an embodiment of the present invention.

Although not illustrated, the electrical discharge machine 100 of FIG. 1 includes: an X-axis driver for moving the X-slider 3 in the left-to-right direction; a Y-axis driver for moving the ram 4 in the front-to-rear direction; a Z-axis driver for moving the main spindle head 5 in the vertical direction; a main spindle driver for rotating the rotational main spindle 6 about the axis CL0; an arm driver for moving the grip arm 9 in the vertical direction; a B-axis driver for tilting the pivotable member 14 via the pivot CLb; and an A-axis driver for rotating the rotary table 15 via the pivot CLa. The X-axis driver, Y-axis driver, Z-axis driver and arm driver may be configured of a ball screw and a servo motor for rotationally driving the ball screw, for example. The main spindle driver may be configured of a spindle motor, for example. The B-axis driver and A-axis driver may be configured of a DD (direct drive) servo motor, for example. All of the above X-axis driver, Y-axis driver, Z-axis driver, arm driver, main spindle driver, B-axis driver and A-axis driver may be collectively referred to as a driving unit 35 (FIG. 6). The driving unit 35 is controlled by an NC unit 42 (FIG. 6).

With the above configuration, the electrode holder 7 and electrode guide 8 can move in the X-axis direction, Y-axis direction and X-axis direction with respect to the workpiece 20. Accordingly, it is possible to machine the workpiece 20 into a desired 3D shape. Raising and lowering the grip arm 9 by the arm driver enables adjustment of the distance between the electrode holder 7 and the electrode guide 8, and therefore it is possible for the electrode holder 7 and the electrode guide 8 to support the top and bottom ends of electrode 10 during machining even though the length of electrode 10 changes due to consumption of the electrode 10.

Provided on the front face of ram 4 is a position detector 31 such as a linear scale or the like for detecting the Z-axis position along the vertical direction of the main spindle head 5. Based on the signal from the position detector 31, it is possible to detect the position of electrode holder 7, or the position of the upper end of electrode 10. The bracket 4a of grip arm 9 is equipped with a position detector 32 for detecting the W-axis position along the vertical direction of grip arm 9 relative to the ram 4. Based on the signal from the position detector 32, it is possible to detect the position of electrode guide 8 relative to ram 4.

There is a fixed relationship (known value) unique to the machine between the Z-axis position and the W-axis position. The position detectors 31 and 32 detect the position of electrode holder 7 and the electrode guide 8, respectively, as a distance from the reference position in the machine coordinate system. Accordingly, based on the signals from position detectors 31 and 32, the distance D between the lower end of electrode holder 7 and the upper end of electrode guide 8 can be calculated. Approaching motion of the electrode holder 7 to the electrode guide 8 is permitted until the distance D is equal to a predetermined value D1. When the distance D is equal to or lower than the predetermined distance D1, the approaching motion is stopped so as to prevent contact between the electrode holder 7 and the electrode guide 8. Although not illustrated, an electrode magazine is provided at the side of the arm 9. A plurality of electrodes 10 for replacement having an initial length L0 (known) are stored in the electrode magazine, so that electrodes 10 can be exchanged between the main spindle 6 and the tool magazine by an unillustrated replacing means.

Examples of workpiece 20 include turbine blades and vanes used for gas turbines, jet engines, etc. Since the turbine blade is exposed to high-temperature gas at about 1000° C. to 1500° C., nickel alloys that have high heat resistance are used as the composition material. In order to cool the surface of the turbine blade, cooling holes for conducting cooling air are formed.

Figure 2:
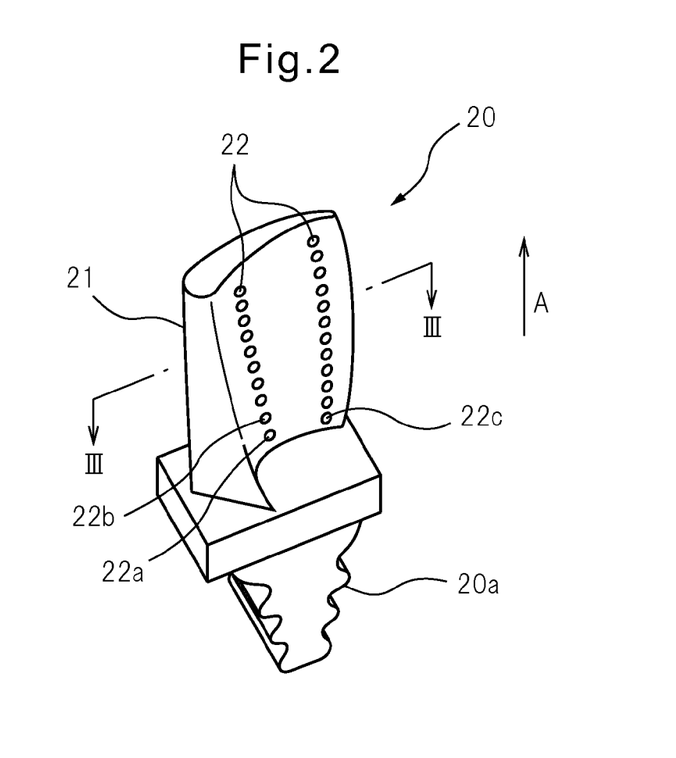
FIG. 2 A perspective view of a turbine blade as an example of a workpiece to which the present invention is applied.
Figure 3:
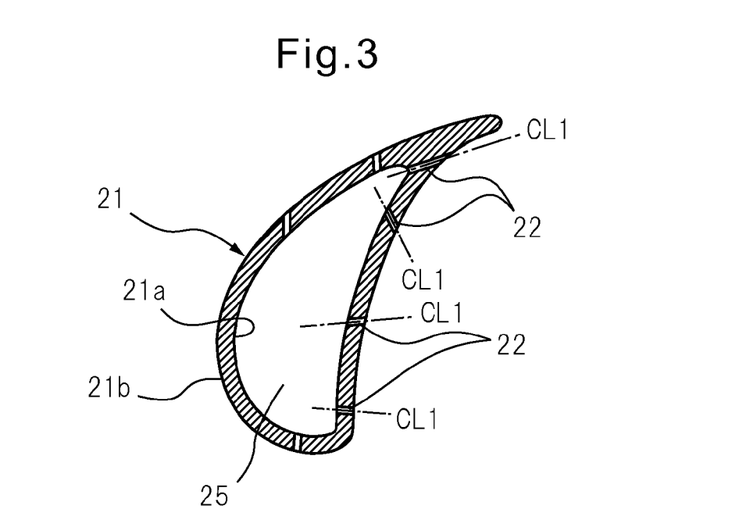
FIG. 3 A sectional view cut along III-III in FIG. 2.

FIG. 2 is a perspective view of a turbine blade as one example of workpiece 20. FIG. 3 is a sectional view cut along III-III in FIG. 2. For example, a Christmas tree-shaped supporter 20a is formed at one end of a turbine blade 20. In the assembled state of an engine, the supporter 20a is attached to the peripheral side of a rotatable rotor. The turbine blade 20 is formed by a lost-wax casting process, for example.

As shown in FIGS. 2 and 3, a cavity 25 is formed inside the airfoil 21 of the turbine blade 20. The airfoil 21 has an interior surface 21a facing the cavity 25 and an exterior surface 21b exposed to high-temperature gas. The airfoil 21 has cooling holes 22 formed penetrating therethrough at multiple positions in the peripheral direction of airfoil 21 and aligned in large numbers in the height direction (in the direction of arrow A in FIG. 2) of airfoil 21. Cooling air is supplied to the cavity 25 from the rotor side and discharged from individual cooling holes 22. With this arrangement, a film of cooling air flows along the external surface 21b to cool the airfoil 21.

A nickel alloy that forms the turbine blade is a material that is difficult to cut. That is, it is difficult to form holes for cooling holes 22 by drilling or the like. Accordingly, in the present embodiment, the electrical discharge machine 100 is used to machine a multiple number of cooling holes 22 in the turbine blade. Cooling holes 22 are machined one by one. When machining of one cooling hole 22a in FIG. 2 is finished, another cooling hole 22b adjacent to cooling hole 22a, or another cooling hole 22c closest to cooling hole 22a, is machined.

Figure 4:
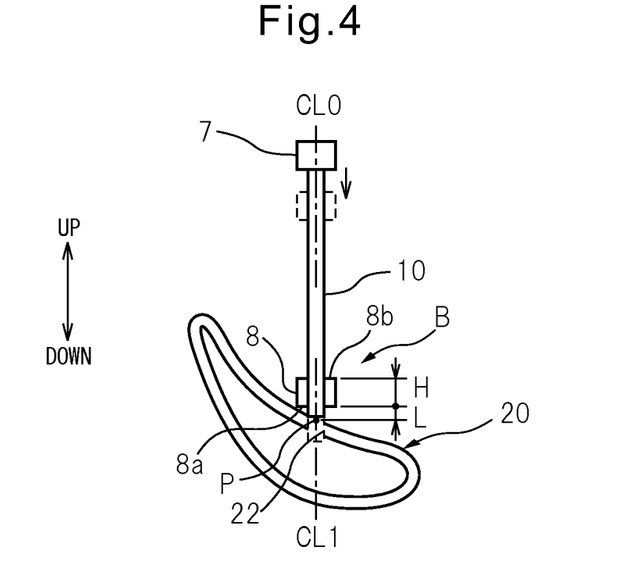
FIG. 4 A diagram illustrating a machining operation on a workpiece by the electrical discharge machine of FIG. 1.

FIG. 4 is a diagram schematically illustrating a machining operation of cooling holes 22. As shown in FIG. 4, in machining a cooling hole 22, the workpiece 20 is held by the tiltable rotary table device 12 in such a machining attitude that the central axis CL1 of the cooling hole 22 is oriented in the vertical direction. Further, a move of the electrode guide 8 along the W-axis is instructed by the machining program so as to move the electrode guide 8 to the electrode support position B above the machining start point P on the workpiece 20. From this condition, the electrode holder 7 is moved down so that the electrode 10 moves down, whereby the workpiece 20 is machined with the tip of the electrode 10 by electrical discharging (the broken line in FIG. 4). During machining, the grip arm 9 is fixed relative to ram 4 in order to position the electrode guide 8 at the electrode supporting position B regardless of downward movement of the electrode holder 7. By this arrangement, the upper and lower ends of electrode 10 are supported above the workpiece 20, whereby it is possible to suppress oscillation of the electrode 10 during machining.

When hole-machining is performed on the workpiece 20, if the distance L between the machining start point P and the lower endface 8a of electrode guide 8 is long, oscillation of the electrode 10 during machining is large. As a result, the processing accuracy degrades and the processing time becomes longer. Accordingly, in order to perform hole-machining efficiently, it is preferable that the distance L is as short as possible. In FIG. 4, H represents the height between the lower endface 8a to the upper endface 8b of electrode guide 8 (the total height of electrode guide 8).

Figure 5:
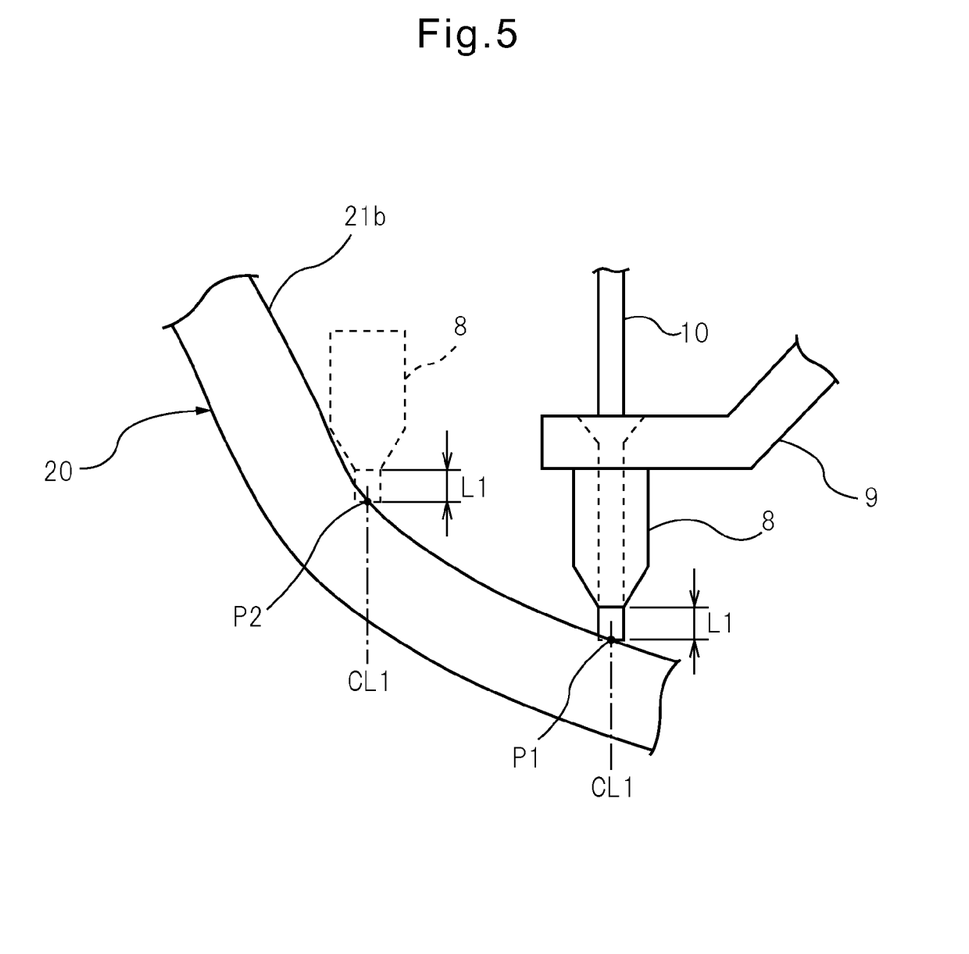
FIG. 5 A partially enlarged view of FIG. 1.

FIG. 5 is a partially enlarged view of FIG. 1. FIG. 5 gives a comparative example of the present embodiment, in which the position of electrode guide 8 (which will be referred to as the target electrode guide position) is set so that the distance L from the machining start point P (P1, P2) to the upper position takes a predetermined value L1. Hereinbelow, the position of electrode guide 8 is represented by the position of the lower endface 8a of the electrode guide.

At the machining point P1 in FIG. 5, since the external surface 21b of the workpiece 20 has a small angle of inclination, the electrode guide 8 will not interfere with the workpiece surface. On the other hand, at the machining point P2, the external surface 21b has a large angle of inclination, the electrode guide 8 interferes with the workpiece surface. Setting the target electrode guide position so that the distance L from the machining start point P will constantly take the predetermined value L in the above way, may result in the electrode guide 8 interfering with the workpiece surface when the workpiece 20's machining attitude (the angle of inclination of the workpiece surface) varies. In order to prevent this, the present embodiment sets the target electrode guide position for each cooling hole 22 as described below.

FIG. 6 is a block diagram illustrating essential components of an electrode guide position setting device 30 according to the embodiment of the present invention. The electrode guide position setting device 30 is a computer including a processing unit formed of CPU, ROM, RAM other peripheral circuitry, etc. The electrode guide position setting device 30 is built in a CAM unit (Computer Aided Manufacturing Unit) 40. The electrode guide position setting device 30 may be provided separately from the CAM unit 40. In FIG. 6, in order to explain the function of electrode guide position setting device 30, a CAD unit (Computer Aided Design Unit) 41, an NC unit (Numerical Control Unit) 42 and the electrical discharge machine 100 are illustrated together.

The CAD unit 41 generates a 3D model of the electrical discharge machine 100 based on the shape data of each part of electrical discharge machine 100. The CAM unit 40 acquires CAD data from the CAD unit 41 and performs predetermined operations using this CAD data to generate a machining program. The NC unit 42 acquires the machining program from CAM unit 40, and outputs control signals to the driving unit 35 of electrical discharge machine 100 based on the machining program to control the operation of the electrical discharge machine 100.

Electrode guide position setting device 30 is connected with an input unit 31 that allows the user to input various instructions and a display unit 32 for displaying various pieces of information and images. Electrode guide position setting device 30 includes, as functional compositions, a model acquisition unit 36 for acquiring CAD data or the 3D model of the electrical discharge machine 100 from CAD unit 41; a simulation unit 37 for performing predetermined simulation using the 3D model; a display control unit 38 for displaying simulation images on the display unit 32; and a setting unit 39 for setting the target electrode guide position as a result of simulation.

Figure 7:
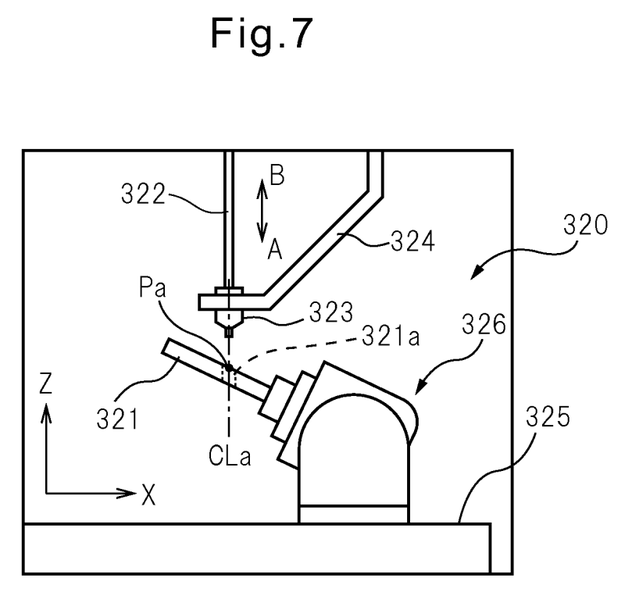
FIG. 7 A diagram illustrating one example of a display image displayed on a display unit in FIG. 6.

FIG. 7 is a diagram illustrating one example of a display image displayed on the display unit 32, in particular, one example of a simulation image of a 3D model 320 of the essential parts of the electrical discharge machine 100. The 3D model 320 of the electrical discharge machine 100 is depicted as a 2D image (XZ-plane), but it actually a 3D image.

As shown in FIG. 7, the 3D model 320 displayed on the display unit 320 includes a workpiece model 321 representing the shape of workpiece 20, an electrode model 322 representing the shape of electrode 10, an electrode guide model 323 representing the shape of electrode guide 8, a grip arm model 324 representing the shape of grip arm 9, a table model 325 representing the shape of table 11 and a tiltable rotary table device model 326 representing the shape of tiltable rotary table device 12. All of models 321 to 326 are rendered based on CAD data.

In the figure, a point Pa on the surface of workpiece model 321 is a machining point on the model corresponding to the machining point P (FIG. 4) of workpiece 20. The workpiece model 321 is represented in a machining attitude for machining the machining point Pa. Corresponding to this workpiece model 321, the electrode model 322 and electrode guide model 323 are displayed on the axis CLa that passes through the machining point Pa and is parallel to the Z-axis on the model. The workpiece model 321 represents the work shape after hole-machining (FIG. 2), so that the workpiece model 321 has been already formed with holes 321a corresponding to cooling holes 22.

Figure 8:
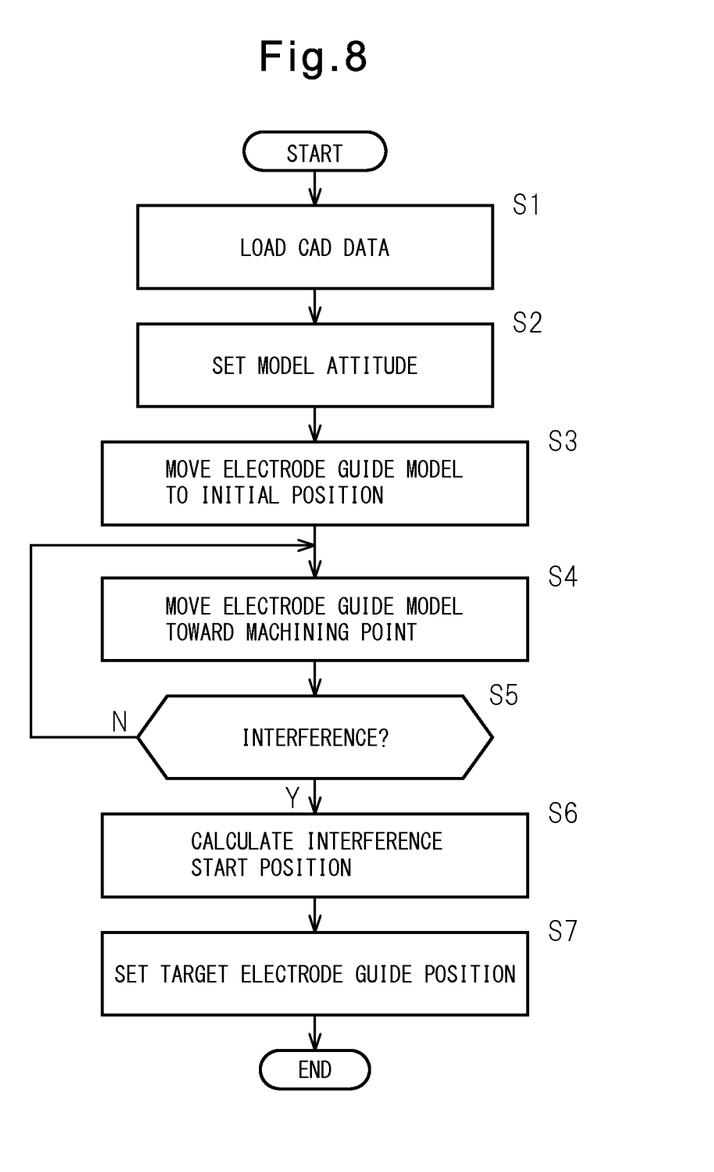
FIG. 8 A flow chart for illustrating one example of a process executed by the electrode guide position setting device of FIG. 6.

FIG. 8 is a flow chart for explaining one example of the process executed by the CPU of the electrode guide position setting device 30. The process given by this flow chart is started when, for example, a command of reading CAD data is input by the operation of the input unit 31.

At Step S1, CAD data is loaded from the CAD unit 41. As a result, the 3D model 320 of electrical discharge machine 100 including the workpiece model 321, electrode model 322, electrode guide model 323, grip arm model 324, table model 325 and tiltable rotary table device model 326, is acquired.

At Step S2, the attitude of the workpiece model 321 is set. In this case, first the machining point Pa on the workpiece model 321 is automatically recognized. For example, a cylindrical part is searched from the workpiece model 321. This cylindrical part is regarded as a hole 321a, and the point of intersection between the axis CLa cutting through the center of hole 321a and the external surface of the workpiece model 321 is set as a machining point Pa. Then, the attitude of the workpiece model 321 when the axis CLa is parallel to the Z-axis is set as a machining attitude, and the amounts of rotation of the A-axis and B-axis of tiltable rotary table model 326 corresponding to the machining attitude are identified. Further, the X-coordinate, Y-coordinate and Z-coordinate of the electrode holder 7 is identified based on the position of the electrode model 322 on the axis CLa. The values on these A-axis, B-axis, X-axis, Y-axis and Z-axis are stored into memory as setting values for configuring the machining program.

At Step S3, the electrode guide model 322 is set at the initial position. The initial position is a point on the axis CLa a predetermined value away from the machining point Pa on the surface of workpiece model 321. The predetermined value is a distance that will not cause interference between the electrode guide model 323 and the workpiece model 321. The Z-coordinate of the initial position may be set constant without regard to the position of the machining point Pa.

At Step S4, the electrode guide model 323 is moved by a predetermined amount ΔL along the axis CLa from the initial position toward the machining point Pa. In other words, the electrode guide model 323 is placed closer to the workpiece model 321.

At Step S5, it is determined whether or not the electrode guide model 323 interferes with the workpiece model 321. For example, it is determined whether or not there is a point of intersection between the electrode guide model 323 and the workpiece model 321. When Step S4 is negative, the control returns to Step S4, and the electrode guide model 323 is brought further closer by the predetermined amount ΔL to the workpiece model 321. When Step S5 is affirmative, the control goes to Step S6.

At Step S6, the position (interference start position) of electrode guide model 323 when the electrode guide model 323 is determined to come into contact with the workpiece model 321 is calculated. Depending on the position of the workpiece model 321 and the position of the machining point P, there are cases where the grip arm model 234 and the workpiece model 321, the electrode guide model 323 and the tiltable rotary table device model 326, the grip arm model 324 and the tiltable rotary table device model 326 may interfere with each other. In such a case, the position is designated at the interference start position.

At Step S7, the electrode guide model 323 is pulled back from the interference start position in the direction by a predetermined distance La (e.g., 3 mm) in the direction away from the workpiece model 321 along the axis CLa, so that the position (the height in the Z-axis direction) of the electrode guide model 323 after the pullback, is stored as a W-axis value into memory. Thereby, the target electrode guide position corresponding to the machining point Pa is set.

The above process is implemented in the same manner for other machining points Pa of the workpiece model 323. As a result, values on X-axis, Y-axis, Z-axis, A-axis, B-axis and W-axis corresponding to all the machining points P at the time of workpiece machining can be identified, and therefore it is possible to prepare a machining program. This machining program is output to the NC unit 42. The NC unit 42 outputs control signals to the driving unit 35, positions the electrode guide 8 at the time of workpiece machining at the target electrode guide position, then moves the electrode holder 7 relative to the electrode guide 8 to move down the electrode holder 7. As a result, the electrode 10 goes down to the machining point P (FIG. 4) on the workpiece surface and machines a cooling hole 22 in the workpiece 20. During this, the electrode guide 8 is positioned at the target electrode guide position until machining of the cooling hole 22 ends.

Controlling the electrode guide 8 to be positioned at the target electrode guide position the predetermined distance La above the contact start point, makes it possible to stably support the electrode 10 at around the lower end thereof by means of the electrode guide 8 without causing the electrode guide 8 to interfere with the workpiece 20 even when the machining attitude of the workpiece 20 changes. Since the value on the W-axis is set in the machining program (NC program), the electrode guide 8 can be moved quickly to the optimal position close to the workpiece surface but out of contact therewith as the machining program proceeds.

In the above process in the electrode guide position setting device 30, the procedure at Step S1 is performed at the model acquisition unit 36, the procedures from Steps S2 to S6 are performed at the simulation unit 37, and the procedure at Step S7 is performed at the setting unit 39. Further, in the embodiment, the result of simulation can be displayed on the display unit 32 by the process at the display control unit 38. This process is performed in parallel with or after the end of simulation, by a simulation display command from the input unit 31.

Figure 9:
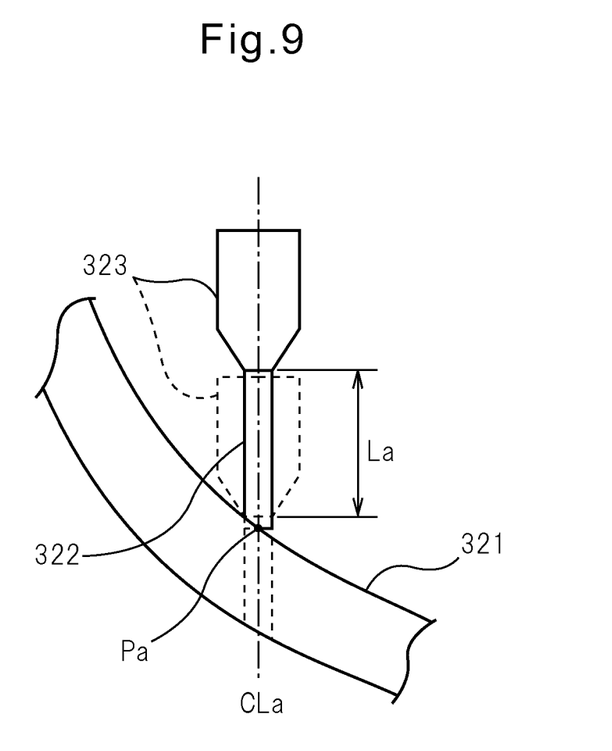
FIG. 9 A diagram for illustrating the process of FIG. 8.

When the simulation result is displayed, at the initial stage, as shown in FIG. 7, for example, the electrode guide model 323 is displayed at the initial position that is located the predetermined distance in the direction away from the machining point Pa along the axis CLa (Step S3). Then, the electrode guide model 323 gradually moves in the direction of A in FIG. 7 along the axis CLa parallel to the Z-axis on the model and comes close to the workpiece model 321 (Step S4). As shown in FIG. 9, when the electrode guide model 323 interferes with the workpiece model 321, the electrode guide model 323 moves the predetermined distance La from the interference start position (the broken line) in the direction away from the workpiece model 321 (in the direction of B in FIG. 7) along the axis CLa. Thereby, the electrode guide model 323 is positioned at the target electrode guide position (the solid line).

Displaying the simulation result on the display unit 32 enables the user to easily know the target electrode guide position. It is possible to perform such display that the display style (e.g., the color of the electrode guide model 323) on the display unit 32 is changed when the electrode guide model 323 interferes with the workpiece model 321. With this, it is possible for the user to easily recognize the initial position of interference.

In the present embodiment, the electrode guide 8 is disposed below the electrode holder 7 that supports the upper end of the bar-like, vertically extended electrode 10, in a vertically movable manner relative to the electrode holder 7, and the electrode guide 8 supports the peripheral side of the electrode 10 at the lower end so that the electrode 10 can move up and down (FIG. 1). The electrode guide position setting device 30 that sets the guide position (target electrode guide position) of this electrode guide 8, includes the model acquisition unit 36 for acquiring the 3D model 320 (FIG. 7) of the electrical discharge machine 100 including the workpiece model 321 arranged in a machining attitude and the electrode guide model 323 disposed along the axis CLa on the model that passes through the machining point Pa on the workpiece model 321; a simulation unit 37 that based on the acquired 3D model 320, computes the interference start position (the broken line in FIG. 9) at which the electrode guide model 323 begins interfering with the workpiece model 321 when the electrode guide model 323 is brought close to the workpiece model 321 along the axis CLa; a setting unit 39 for setting the target electrode guide position (the solid line in FIG. 9) obtained by moving the electrode guide model 323 the predetermined distance La in the direction away from the calculated interference start position on the workpiece model 321 along the axis CLa.

Further, the electrical discharge machining method of the present embodiment, includes the steps of: generating a 3D model 320 of the electrical discharge machine, including the workpiece model 321 arranged in a machining attitude and the electrode guide model 323 disposed along the axis CLa on the model that passes through the machining point Pa on the workpiece model; computing the interference start position at which the electrode guide model 323 begins interfering with the workpiece model 321 when the electrode guide model 323 is brought close to the workpiece model 321 along the axis CLa (Step S6); setting the position obtained by moving the electrode guide model 323 the predetermined distance La in the direction away from the interference start position on the workpiece model 321 along the axis CLa, as an electrode guide position (Step S7); and lowering the electrode 10 toward the workpiece surface by moving down the electrode holder 7, hence lowering the electrode 10 toward the workpiece surface while the electrode guide 8 is positioned at the electrode guide position, to perform electrical discharge machining on the workpiece 20.

According to the above configuration, the distance L (FIG. 4) from the surface of workpiece 20 to the lower endface of electrode guide 8 varies in accordance with the machining attitude of workpiece 20. Therefore, it is possible to set the electrode guide 8 at the optimal position at which the electrode guide 8 is positioned closet to the workpiece surface without causing any interference with the workpiece surface. As a result, it is possible to perform hole machining of the workpiece 20 efficiently with precision.

As described above, in the present embodiment, the height of the electrode guide 8, i.e., the position on the W-axis, is modified in accordance with the machining attitude of the workpiece 20. Therefore, if the height of the machining fluid in the processing tank 17 at the time of hole machining is fixed, there is a risk that the rotational main spindle 6 is soaked in the machining fluid when the target electrode guide position is set at a low point and the electrode holder 7 moves close to the electrode guide 8 as hole machining proceeds. If the rotational main spindle 6 is soaked in the machining fluid, the machining fluid penetrates into the interior of rotational main spindle 6, inducing failures. Even if the rotational main spindle 6 is not immersed in the machining fluid, immersion of the electrode holder 7 in the machining fluid scatters the working liquid over the area around, degrading the working environment. Further, in some cases, air discharge that occurs when the machined part is not immersed may occur, and therefore makes machining unstable.

To deal with this, the present embodiment varies the height of the liquid level of the machining fluid in accordance with the height of the electrode guide 8 at the time of electrical discharge machining. Next, this aspect will be described.

Figure 10:
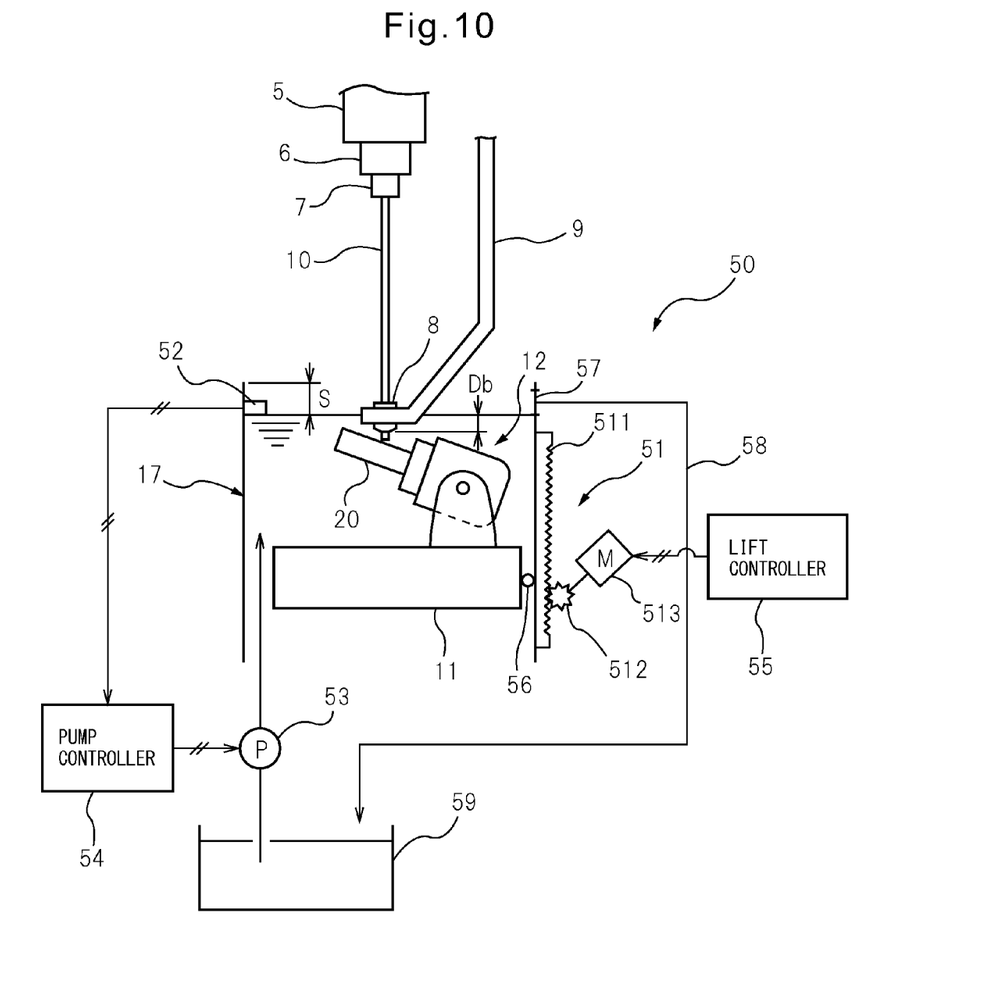
FIG. 10 A diagram illustrating a schematic configuration of a liquid level varying device according to an embodiment of the present invention.

FIG. 10 is a diagram illustrating the schematic configuration of a liquid level varying device 50 according to an embodiment of the present invention. Here, the same components as those in FIG. 1 are allotted with the same reference numerals. The liquid level varying device 50 includes a lifting mechanism 51 for moving up and down the processing tank 17 in the form of a square cylinder; a liquid level detector 52 for detecting the height of the liquid level; a machining fluid pump 53 for supplying a machining fluid to processing tank 17; a pump controller 54 for controlling the drive of the working liquid pump 53; and, a lift controller 55 for controlling the operation of the lifting mechanism 51. Interposed between the inner peripheral side of processing tank 17 and the outer peripheral side of table 11 is a seal 56, above which the machining fluid is stored.

The lifting mechanism 51 includes a rack 511 formed on the outer peripheral side of the processing tank 17 and a pinion 512 engaging the rack 511 and a motor 513 for driving the pinion 512, and moves up and down the processing tank 17 by rotation of the motor 513. Herein, the lifting mechanism 51 is configured of a rack-and-pinion-type mechanism, but the configuration of lifting mechanism 51 is not limited thereto.

The liquid level detector 52 is attached on the inner peripheral side of the processing tank 17 at a position a predetermined distance S downward from the upper edge of the processing tank 17. The liquid level detector 52 is a float switch that turns on when the machining fluid reaches the liquid level detector 52 and turns off when the liquid level is located below the liquid level detector 52. Turning on and off of the liquid level detector 52 enables detection of whether the height of the liquid level rises up to the position the predetermined distance S from the upper edge of the processing tank 17.

The processing tank 17 has a drain port 57 that is opened at a position somewhat above the turn-on position of the liquid level detector 52. The machining fluid flowing out from the drain port 57 is collected into a tank 59 via a return pipe path 58. Accordingly, the height of the liquid level of the machining fluid will not be higher than the drain port 57.

The pump 53 is a volume-variable pump that can provide two, high and low, selectable pumping volumes, so that the discharge quantity of the machining fluid into processing tank 17 can be varied by selection of pumping volume. Alternatively, the pump 53 may be configured to be able to select rotational speed between high and low modes, and therefore the discharge quantity of the machining fluid can be changed by selection of rotational speed while the pumping volume is fixed.

A pump starting switch (not illustrated) is connected to the pump controller 54. This pump starting switch is turned off when the machining fluid has been collected and the processing tank 17 is set down for preparatory work or replacement work of electrode 10. In this case, the pump controller 54 outputs a drive suspension signal to the pump 53 to stop the drive of the pump 53. After finishing preparatory work or replacement of electrode 10, the processing tank 17 moves up and the pump starting switch is turned on, the pump controller 54 outputs a drive signal to the pump 53 to start the pump 53.

When the pump starting switch is in on-state, the pump controller 54 selects pumping volume in accordance with the signal from the liquid level detector 52. Specifically, when the liquid level detector 52 is off, the pumping volume is set high, and when the liquid level detector 52 is turned on, the pumping volume is set low. With this arrangement, when, for example, electrical discharge machining work is started after preparatory work, the pump 53 discharges a large quantity of machining fluid until the liquid level detector 52 is turned on. As a result, it is possible to supply the necessary amount of machining fluid into the processing tank 17 swiftly, and thereby improve working efficiency. After liquid level detector 52 is turned on, the amount of discharge from the pump 53 is cut down so that the machining fluid in the processing tank 17 can be constantly circulated during electrical discharge machining.

The lift controller 55 controls the drive of the motor 513 so that the height from the target electrode guide position to the drain port 57 (the machining fluid surface) will coincide with the predetermined value Db, as shown in FIG. 10. That is, using the target electrode guide position as a parameter, the height of the drain port 57 is controlled to be the target electrode guide position plus the predetermined value Db. The predetermined value Db may be set to be equal to the full height H (FIG. 4) of electrode guide 8, for example, or set at about one half of the full height H. With this setting, the machining fluid level will not be higher than the position of electrode guide 8, and therefore it is possible to prevent the rotational main spindle 6 and electrode holder 7 from being soaked in the machining fluid. In other words, since it is only necessary to prevent the electrode holder 7 from being immersed in the machining fluid, it is also possible to control supply of the machining fluid so that the level of the machining fluid surface is kept between the bottom face of the electrode holder 7 and the bottom face of the electrode guide 8.

Although not illustrated, a signal from an electrical discharge starting switch to instruct the start of electrical discharge work is input to the lift controller 55. When receiving a command of starting electrical discharge work from this electrical discharge starting switch (machining state), the lift controller 55 performs lifting control of the processing tank 17 in accordance with the target electrode guide position as stated above. On the other hand, in the non-machining state in which no command of starting electrical discharge has been given, the machining fluid in the processing tank 17 is collected into the tank 59 and the processing tank 17 is kept down at the lowermost position without performing any lifting control of the processing tank 17. This arrangement prevents the processing tank 17 from disturbing preparatory work, replacement, etc., and therefore work efficiency is improved.

Although in FIG. 10 the lift controller 55 is configured independently, the function of the lift controller 55 may be built into the electrode guide position setting device 30. For example, after the target electrode guide position has been set in the process (Step S7) in FIG. 8, the target electrode guide position plus the predetermined value Db may be set as the target drain port height so that the target drain port height may be involved in the machining program. With this technique, the NC unit 42 will output control signals to the motor 513 based on the machining program so as to be able to optimally control the height of the processing tank 17. The machining program includes M codes which call for a command to start electrical discharge machining. Accordingly, based on the M code it is possible to provide a configuration in which the height of the processing tank 17 is controlled using the target electrode guide position as a parameter or without regard to the target electrode guide position.

VARIATIONAL EXAMPLE

In the above embodiment, the 3D model 320 is adapted to include the workpiece model 321, electrode model 322, electrode guide model 323, grip arm model 324, table model 325 and tiltable rotary table device model 326. However, as long as, at least, the workpiece model 321 disposed in a machining attitude and the electrode guide model 323 arranged along the axis CLa on the model that passes through the machining point Pa on the workpiece model 321 are included, the configuration of 3D model 320 is not limited to the above. In this case, instead of configuring the workpiece model 321 with the workpiece 20 only, the workpiece model 321 may also include a jig that fixes the workpiece 20 and a supporting structure (tiltable rotary table device 12, table 10, etc.) for supporting the workpiece 20.

Although in the above embodiment the result of simulation is adapted to be displayed on the display unit 32, this feature is not essential. The simulation unit 37 as an operation part may have any configuration as long as it is based on the acquired 3D model 320, computes the interference start position at which the electrode guide model 323 begins interfering with the workpiece model 321 when the electrode guide model 323 is brought close to the workpiece model 321 along the axis CLa. The electrical discharge machine 100 may have any configuration as long as it includes a bar-like, vertically extended electrode 10, an electrode holder 7 supporting the upper end of electrode 10, and an electrode guide 8 that is arranged under the electrode holder 7 so as to be vertically movable relative to the electrode holder 7 and that supports the peripheral side of the electrode 10 at the lower end so that the electrode 10 can move up and down. Although the pipe electrode 10 is used, the solid electrode can also be used.

Although in the above embodiment, a turbine blade is used as an example of the workpiece 20, the electrical discharge machining method of the present invention can be applied to a case where another workpiece is machined. Accordingly, it is possible to apply the electrical discharge machining method of the present invention to a case where the machining attitude of workpiece 20 varies other than the case where cooling holes are machined.

According to the present invention, the interference start position at which the electrode guide model begins interfering with the workpiece model when the electrode guide model is brought close to the workpiece model is computed, and the position obtained by moving the electrode guide model a predetermined distance in the direction away from the interference start position is set as an electrode guide position. Accordingly, even if hole machining is performed on a tilted workpiece surface, etc., it is possible to support the electrode in close proximity to the workpiece surface by means of the electrode guide without causing any interference of the electrode guide with the workpiece surface. Since the level of the working liquid surface can be changed so as to set the working surface level at a position a predetermined distance above the electrode guide position that has been correctly set up, it is possible to readily and smoothly set the working liquid level. As a result, it is possible to eliminate problems such as the electrode holder and the rotary main spindle from being soaked in the working liquid or conversely the machining parts are exposed above the working liquid surface causing air discharge.

REFERENCE SIGNS LIST 7 electrode holder
8 electrode guide
10 electrode
20 workpiece (turbine blade)
30 electrode guide position setting device
36 model acquisition unit
37 simulation unit
39 setting unit
40 CAM unit
41 CAD unit
42 NC unit
100 electrical discharge machine
Pa machining point
CLa axis

The invention claimed is:

1. An electrical discharge machining method for machining a workpiece at a plurality of machining points sequentially by means of an electrical discharge machine including a vertically extended, bar-like electrode, an electrode holder configured to support an upper end of the electrode, an electrode guide that is arranged under the electrode holder so as to be movable vertically relative to the electrode holder and that supports a peripheral side of the electrode at a lower end so that the electrode can move up and down, and a tiltable rotary table which can arrange the workpiece at a plurality of machining attitudes corresponding to the machining points, the method comprising:

generating a 3D model of an electrical discharge machine including a workpiece model that is arranged at a machining attitude and an electrode guide model disposed along a vertical axis of the electrode guide model that passes through one of the machining points on the workpiece model;

computing an interference start position at which the electrode guide model begins interfering with the workpiece model when the electrode guide model is moved toward the workpiece model along the vertical axis;

setting a position, obtained by moving the electrode guide model without changing a shape thereof a predetermined distance along the vertical axis away from the interference start position on the workpiece model, as a target electrode guide position at which the electrode guide is held during performing the electrical discharge machining on the workpiece at the one of the machining points;

setting a target electrode guide position for each of the plurality of machining points; and at each of the machining points, lowering the electrode toward the workpiece surface by moving the electrode holder down while the electrode guide is positioned at a corresponding target electrode guide position after the workpiece is arranged at a corresponding machining attitudes for each of the machining points, whereby the workpiece is machined by electrode discharge machining with the machining attitudes of the workpiece and the target electrode guide positions respectively determined for each of the plurality of machining points.

2. The electrical discharge machining method according to claim 1, wherein the electrical discharge machine includes an elevating processing tank, provided so as to enclose the workpiece, for accumulating a machining fluid, the method further comprising a step of:

supplying a machining fluid to the processing tank so that the level of the machining fluid surface at the time of electrical discharge machining of the workpiece is positioned between the bottom face of the electrode holder and the bottom face of the electrode guide set at the previous step.

3. An electrical discharge machine tool for machining a workpiece at a plurality of machining points sequentially, the electrode discharge machine including a vertically extended bar-like electrode, an electrode holder configured to support an upper end of the electrode, an electrode guide that is arranged under the electrode holder so as to be movable vertically relative to the electrode holder and that supports a peripheral side of the electrode at a lower end so that the electrode can move up and down, a tiltable rotary table which can arrange the workpiece at a plurality of machining attitudes corresponding to the machining points, and an electrode guide position setting device configured to set the position of the electrode guide for each of the plurality of machining points, the machine tool comprising:

a model acquisition unit for acquiring a 3D model of an electrical discharge machine including a workpiece model arranged at a machining attitude and an electrode guide model disposed along an axis of the electrode guide model that passes through the machining point on the workpiece model;

an operation unit that based on the 3D model acquired by the model acquisition unit, computes an interference start position at which the electrode guide model begins interfering with the workpiece model when the electrode guide model is moved toward the workpiece model along the axis; and a setting unit for setting the position obtained by moving the electrode guide model without changing a shape thereof along the axis a predetermined distance in the direction away from the interference start position calculated by the operation unit, as a target electrode guide position the setting unit setting a target electrode guide position for each of the plurality of machining points, at each of the machining points, the electrode guide is positioned at a corresponding target electrode guide position set by the setting unit after the workpiece is arranged at a corresponding attitude for each of the machining points, whereby the workpiece is machined by electrode discharge machining with the machining attitudes of the workpiece and the target electrode guide positions, respectively determined sequentially for the plurality of machining points.

* * * * *